(12) United States Patent
Peng

(10) Patent No.: US 6,959,444 B2
(45) Date of Patent: Oct. 25, 2005

(54) APPARATUS FOR CHANGING OPTICAL DISKS

(75) Inventor: Wen-Kuan Peng, Taoyuan Hsien (TW)

(73) Assignee: Quanta Storage Inc., Taoyuan Shien (TW)

( * ) Notice: Subject to any disclaimer, the term of this patent is extended or adjusted under 35 U.S.C. 154(b) by 180 days.

(21) Appl. No.: 10/673,498

(22) Filed: Sep. 30, 2003

(65) Prior Publication Data

US 2004/0210918 A1 Oct. 21, 2004

(30) Foreign Application Priority Data

Apr. 15, 2003 (TW) .......................... 92108746 A

(51) Int. Cl.[7] .............................................. G11B 17/03
(52) U.S. Cl. ..................................................... 720/615
(58) Field of Search ........................................ 720/615

(56) References Cited

U.S. PATENT DOCUMENTS 6,396,796 B1 * 5/2002 Kletzl .......................... 720/615
6,459,673 B1 * 10/2002 Becker et al. ............. 369/178.01

* cited by examiner

Primary Examiner—George Letscher
(74) Attorney, Agent, or Firm—Rabin & Berdo, P.C.

(57) ABSTRACT

An apparatus for changing optical disks including a plurality of driving shafts, supported on the bottom plate of an optical disk drive, and a plurality of elastic devices. The driving shafts rotate synchronously around their vertical axes to raise and lower the trays. Each of the driving shafts includes a thread region, threads of which can be engaged with the trays, and an upright region located on the thread region. The pitch for threads in the upper thread portion is larger than that in the lower thread portion of the thread region. Each of the elastic devices has one end fixed to a top end of the upright region of the corresponding driving shaft or fixed beneath the top plate, and the other end provided together with the flat surface between the upright region and the thread region for clamping the trays in the range of the upright regions. Trays are also forced by the elastic devices by rotating the driving shafts to move along the thread from the position held at the upright region to that held at the thread region.

14 Claims, 9 Drawing Sheets

APPARATUS FOR CHANGING OPTICAL DISKS

This application claims the benefit of Taiwan application Serial No. 92108746, filed Apr. 15, 2003.

BACKGROUND OF THE INVENTION

1. Field of the Invention

The invention relates in general to an apparatus for changing optical disks, and more particularly to an apparatus for changing optical disk with incorporated elastic devices.

2. Description of the Related Art

Nowadays, as technology develops and changes with each passing day, and pictures, music, movies and computer software are applied more and more widely, optical disks with the advantages of large capacity, small volume, and secure data storage have become the predominant software loading tool. As a result, an optical disk drive, capable of reading optical disks and designed to simultaneously hold a number of disks in an optical disk drive, has become an essential PC peripheral. By means of the optical disk changer, a particular optical disk can be easily selected and read by the pick-up head of the optical disk drive.

FIG. 1A illustrates a top view of a conventional optical disk changer, and FIG. 1B shows a partially enlarged lateral view of the optical disk changer shown in FIG. 1A. As shown in FIG. 1A and FIG. 1B, an optical disk changer 100, mounted on a bottom plate 160 of an optical disk drive, includes at least driving shafts 102a, 102b, and 102c for clamping disk trays 104a, 104b, 104c, 104d, and 104e. These trays 104a–104e can be raised and lowered to position at different heights by rotating the driving shafts 102a, 102b, and 102c synchronously. The trays 104a, 104b, 104c, 104d, and 104e are provided for respectively holding optical disks 106a, 106b, 106c, 106d, and 106e (only the tray 104a and the disk 106a are shown in FIG. 1A), each of which has a round hole 150 at its center.

In FIG. 1A, there are projecting portions 108a, 108b, and 108c on the outer edge of the tray 104a, which have corresponding inserting holes 110a, 110b, and 110c and engaging projections 112a, 112b, and 112c respectively projecting from inner walls of the inserting holes 110a, 110b, and 110c of the tray 104a. The trays 104b–104e are designed in the same way as the tray 104a.

The driving shafts 102a, 102b, and 102c, respectively inserted into the inserting holes 110a, 110b, and 110c of the tray 104a (as well as those of the trays 104b–104e), are vertically mounted on the bottom plate 160, and are capable of rotating synchronously around their vertical axes. The driving shafts 102a, 102b, and 102c have threads 114 provided for engaging with the engaging projections 112a, 112b, and 112c of the tray 104a(as well as those of the trays 104b–104e). Each of the driving shafts 102a, 102b, and 102c can be divided into an upper thread region 116a, a middle thread region 116b, and a lower thread region 116c. The upper thread region 116a has the same pitch for threads 114 as the lower thread region 116c, and has a smaller one than the middle thread region 116b.

As the driving shafts 102a, 102b, and 102c rotate synchronously around their vertical axes, the trays 104a–104e can be raised and lowered by the driving shafts 102a, 102b, and 102c, thereby allowing the disks 106a–106e to be positioned at different heights. In FIG. 1B, the tray 104a is engaged with the thread 114 in the upper thread region 116a so as to position the disk 106a in the range of the upper thread portions 116a. The trays 104c, 104d, and 104e are engaged with three adjacent threads 114 in the lower thread region 116c so as to position the disks 106c, 106d, and 106e in the range of the lower thread portions 116c. The tray 104b is engaged with the thread 114 in the middle thread region 116b so as to position the disk 106b in the range of the middle thread portions 116b. Since the pitch for threads 114 in the middle thread region 116b is larger than that in the upper and lower thread portions 116a and 116c, the tray 104b is farther apart from other trays 104a, 104c, 104d, and 104e. The disk 106b held at the tray 104b in the range of middle thread regions 116b can be carried to a disk loading in/out position to be loaded out and read by the optical disk drive, or the empty tray 104b can hold the optical disk loaded in by the optical disk drive.

As the number of the trays for holding disks is increased, the number of the threads 114 in the upper and lower thread regions 116a and 116c must also be increased, and the driving shafts 102a, 102b, and 102c must be elongated. As a result, the Optical disk drive equipped with the optical disk changer 100 will be thickened, departing from the preferential tendency of the optical disk drive to a thin and small design. Moreover, owing to the incline of the thread 114, the tray or the disk held at the middle thread region 116b cannot be precisely carried to the disk loading in/out position, thereby reducing the accuracy of positioning of optical disks.

SUMMARY OF THE INVENTION

It is therefore an object of the invention to provide an apparatus for changing optical disks. Elastic devices are designed to urge trays or disks in the range of upright regions of driving shafts to stay close to each other, and hence the height of each driving shaft can be reduced in the case that the number of the trays or disks is not increased. Therefore, the Optical disk drive equipped with the apparatus for changing optical disks can fit the tendency of devices toward a thin and small design. Furthermore, a flat thread part is provided in the thread so as to precisely situate the tray or the disk to a disk loading in/out position, thereby increasing the accuracy of positioning optical disks.

The invention achieves the above-identified object by providing an apparatus for changing optical disks, including a number of driving shafts, and a number of elastic devices. The driving shafts are vertically positioned on the bottom plate of an Optical disk drive for clamping a number of trays or disks. The driving shafts rotate synchronously around their vertical axes to raise and lower the trays or the disks. Each of the driving shafts includes a thread region, mounted on the bottom plate, and an upright region. The thread region, having threads for engaging with the trays, includes a lower thread portion and an upper thread portion. The pitch for threads in the upper thread portion is larger than that in the lower thread portion of the thread region. The upright region is located on the thread region, and a flat surface is formed between the upright region and the thread region. Each of the elastic devices has one end fixed to a top end of the upright region of the corresponding driving shaft or fixed beneath the top plate, and the other end provided together with the flat surface of the corresponding driving shaft for clamping the trays or the disks in the range of the upright regions.

The invention achieves a further above-identified object by providing an apparatus for changing optical disks, including a number of driving shafts, and a number of elastic devices. The driving shafts are vertically positioned on the bottom plate of an Optical disk drive for clamping a number of trays or disks. The driving shafts rotate synchronously around their vertical axes to raise and lower the trays or the disks. Each of the driving shafts includes an upright region, mounted on the bottom plate, and a thread region. The thread region, located on the upright region and having threads for engaging with the trays, includes a lower thread portion and an upper thread portion. The pitch for threads in the upper thread portion is larger than that in the lower thread portion of the thread region. A flat surface is formed between the upright region and the thread region. Each of the elastic devices has one end fixed on the bottom plate and located near the corresponding driving shaft, and the other end provided together with the flat surface of the corresponding driving shaft for clamping the trays or the disks located in the range of the upright regions.

The invention achieves another above-identified object by providing an apparatus for changing optical disks, including a number of driving shafts, and a number of upper and lower elastic devices. The driving shafts are vertically positioned on the bottom plate of an Optical disk drive for clamping a number of trays or disks. The driving shafts rotate synchronously around their vertical axes to raise and lower the trays or the disks. Each of the driving shafts includes a lower upright region, mounted on the bottom plate, and a thread region, located on the lower upright region, and an upper upright region. A lower flat surface is formed between the lower upright region and the thread region, while an upper flat surface formed between the upper upright region and the thread region. Each of the upper elastic devices has one end fixed to a top end of the upper upright region of the corresponding driving shaft or fixed beneath the top plate, and the other end provided together with the upper flat surface of the corresponding driving shaft for clamping the trays or the disks in the range of the upper upright regions. Each of the lower elastic devices has one end fixed on the bottom plate and located near the corresponding driving shaft, and the other end provided together with the lower flat surface of the corresponding driving shaft for clamping the trays or the disks located in the range of the lower upright regions.

Other objects, features, and advantages of the invention will become apparent from the following detailed description of the preferred but non-limiting embodiments. The following description is made with reference to the accompanying drawings.

DETAILED DESCRIPTION OF THE INVENTION

The optical disk changer according to the invention is disposed in an optical disk drive. Elastic devices are designed to allow the trays or disks in the range of upright regions of driving shafts to stay close to each other, and hence the height of the driving shafts can be reduced in the case that the number of the trays or disks is not increased, or the number of the trays for holding disks can be increased in the case that the height of the driving shafts is unchanged. Therefore, the optical disk drive equipped with the optical disk changer in the present invention can present a thin and small design. In addition, a flat thread part is provided in the thread on each driving shaft so as to precisely situate the tray or the disk in the disk loading in/out position, thereby increasing the accuracy of positioning disks. The practical applications of the optical disk changer in the invention will be illustrated in the following examples 1, 2, 3, 4, 5, and 6 with reference to the accompanying drawings.

EXAMPLE 1

Figure 1A:
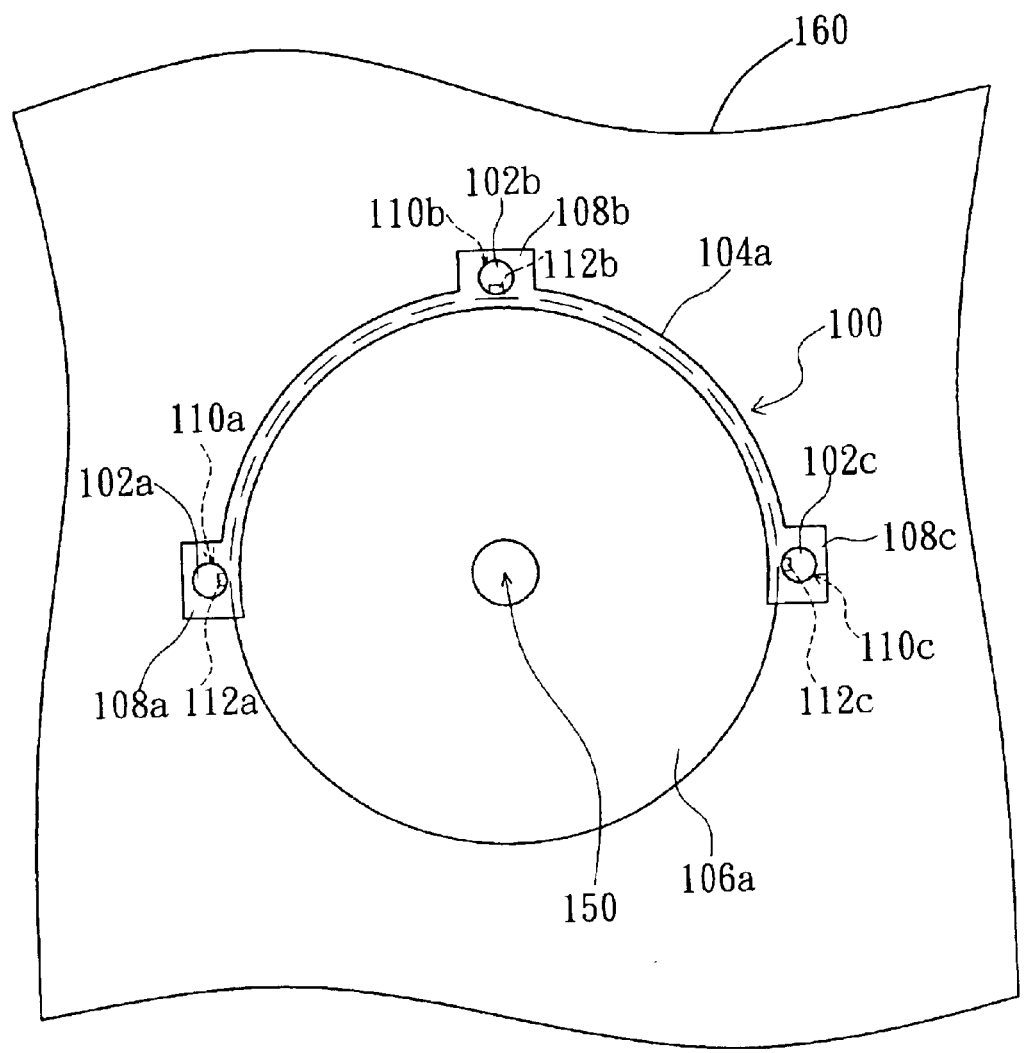
FIG. 1A (Prior Art) is a top view of a conventional optical disk changer.
Figure 1B:
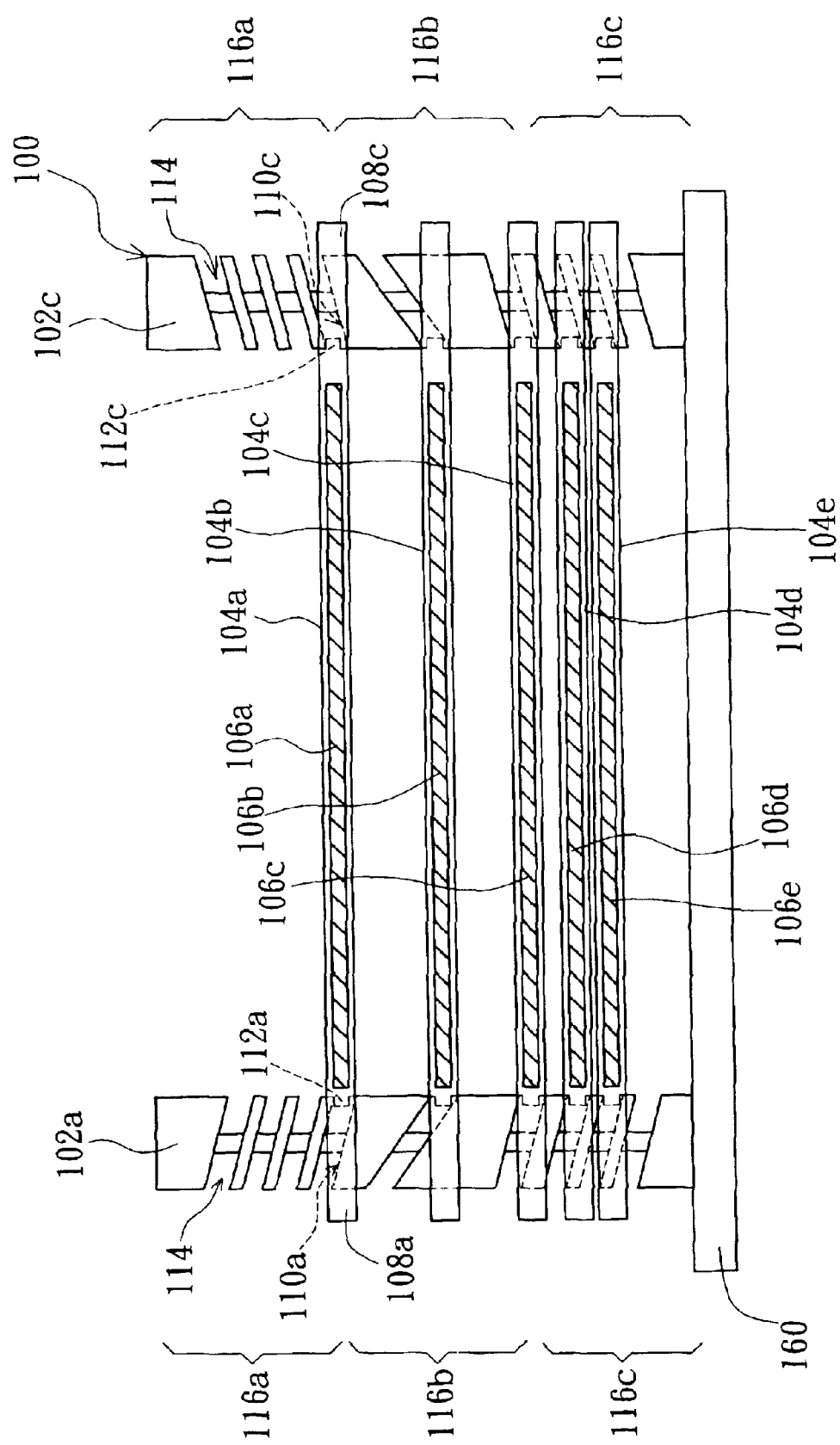
FIG. 1B (Prior Art) is a partial enlarged lateral view of the optical disk changer in FIG. 1A.
Figure 2A:
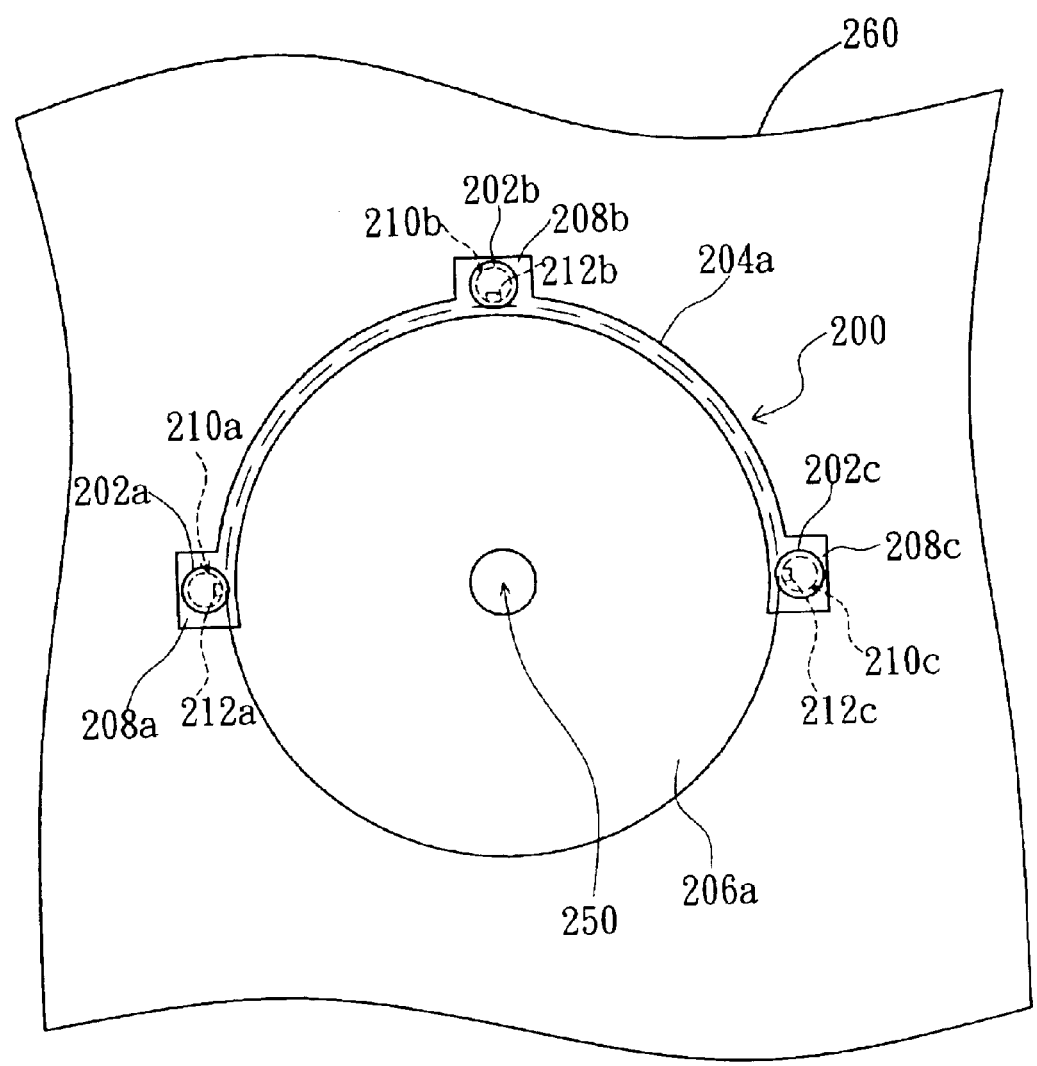
FIG. 2A is a top view of the optical disk changer in Example 1 according to a preferred embodiment of the invention.
Figure 2B:
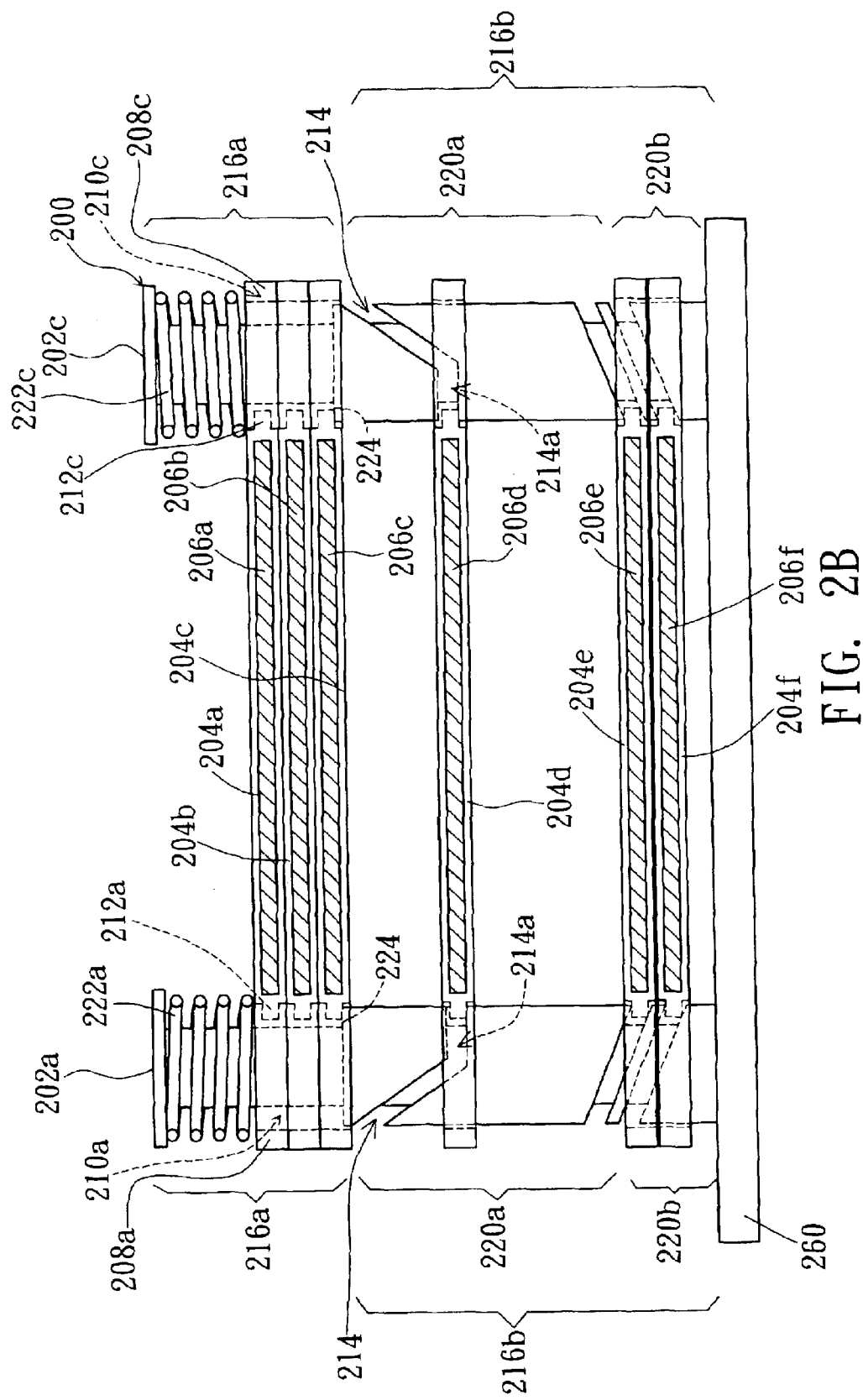
FIG. 2B is a partial enlarged lateral view of the optical disk changer in FIG. 2A.

FIG. 2A shows a top view of the optical disk changer in Example 1 according to a preferred embodiment of the invention, and FIG. 2B shows a partial enlarged lateral view of the optical disk changer in FIG. 2A. As shown in FIG. 2A and FIG. 2B, the optical disk changer 200, mounted on a bottom plate 260 of an optical disk drive, includes at least driving shafts 202a, 202b (not shown in FIG. 2B), and 202c for clamping disk trays 204a, 204b, 204c, 204d, 204e, and 204f. These trays 204a–204f can be raised or lowered to position at different heights by rotating the driving shafts 202a, 202b, and 202c synchronously. The trays 204a–204f are provided for respectively holding disks 206a, 206b, 206c, 206d, 206e, and 206f (only the tray 204a and the disk 206a are shown in FIG. 2A), each of which has a round hole 250 at its center.

In FIG. 2A, there are projecting portions 208a, 208b, and 208c on the outer edge of the tray 204a. The line connecting the projecting portions 208a and 208c, passing through the round hole 250, is perpendicular to that connecting the projecting portion 208b and the round hole 250. The projecting portions 208a, 208b, and 208c have corresponding inserting holes 210a, 210b, and 210c, and engaging projections 212a, 212b, and 212c which respectively project from the inner walls of the inserting holes 210a, 210b, and 210c of the tray 204a. The trays 204b–204f are designed in the same way as the tray 204a.

The driving shafts 202a, 202b, and 202c, respectively inserted into the inserting holes 210a, 210b, and 210c of the tray 204a (as well as those of the trays 204b–204f), are vertically positioned on the bottom plate 260, and are capable of rotating synchronously around their vertical axes so as to raise or lower the trays 204a–204f.

Each of the driving shafts 202a, 202b, and 202c includes an upright region 216a and a thread region 216b, located under the upright region 216a. The upright region 216a and the thread region 216b can be manufactured to a unity. The thread region 216b, mounted on the bottom plate 260, has threads 214 provided for engaging with the engaging projections 212a, 212b, and 212c of the tray 204a (and those of the trays 204b–204f). The thread region 216b can be divided into an upper thread portion 220a and a lower thread portion 220b. The pitch for threads 214 in the upper thread portion 220a is larger than that in the lower thread portion 220b. A flat surface 224 is specifically formed at the interface between the upright region 216a and the thread region 216b. The thread 214 in the upper thread portion 220a has an upper end leading to the flat surface 224, and a flat thread part 214a for advancing one of the trays 204a–204f, for example the tray 204d, to a disk loading in/out position, so that the disk 206d, held at the tray 204d as carried to the disk loading in/out position, can be loaded out by the optical disk drive, or the empty tray 204d can hold the optical disk loaded in by the optical disk drive.

In the invention, the upper ends of the upright regions 216a of the driving shafts 202a and 202c are respectively encircled by coil springs 222a and 222c. Similarly, the upper end of the upright region 216a of the driving shaft 202b is encircled by a coil spring (not shown in FIG. 2B). In FIG. 2B, each of the coil springs 222a and 222c has one end fixed to the top end of the upright region 216a. As trays 204a–204f are carried from the position held at the thread region 216b to that held at the upright region 216a by rotating the driving shafts 202a, 202b and 202c, they will be clamped between the other end of the coil spring 222a or 222c and the flat surface 224 of the corresponding driving shaft 202a or 202c. Conversely, trays 204a–204f can be forced by coil springs 222a and 222c by rotating the driving shafts 202a, 202b, and 202c to move from the position held at the upright region 216a to that held at the thread region 216b.

As the driving shafts 202a, 202b, and 202c rotate synchronously around their vertical axes, coil springs 222a, 222b, and 222c can be compressed or released, and the trays 206a–206f, accordingly, raised and lowered along the threads 214 and may thereby be located at different heights. As shown in FIG. 2B, the trays 204a, 204b, and 204c are held together tightly between the coil spring 222a, 222b (not shown in the figure), or 222c and the corresponding flat surface 224 so as to position the disks 206a, 206b, and 206c in the range of the upright regions 216a. The trays 204e and 204f are engaged with the threads 214 of the lower thread portion 220b so as to position the disks 206e and 206f in the range of the lower thread portions 220b.

Since the pitch for threads 214 in the upper thread portion 220a of the thread region 216b is larger than that in the lower thread portion 220b of the thread region 216b, the tray 204d engaged with the flat thread part 214a is separated from other trays 204a, 204b, 204c, 204e and 204f. Due to the design of the flat thread part 214a, the tray 204d engaged with the flat thread part 214a can be precisely carried to the disk loading in/out position so as to be loaded out and read by the optical disk drive. Alternatively, the empty tray 204d can hold optical disks loaded in by the optical disk drive.

The trays 204a–204f in the optical disk changer 200 mentioned above can also be removed as long as the driving shafts 202a–202c are suitably situated respective to each other so that the threads 214 on the driving shafts 202a–202c can be directly engaged with the disks 206a–206f so as to raise and lower the disks.

EXAMPLE 2

Figure 3:
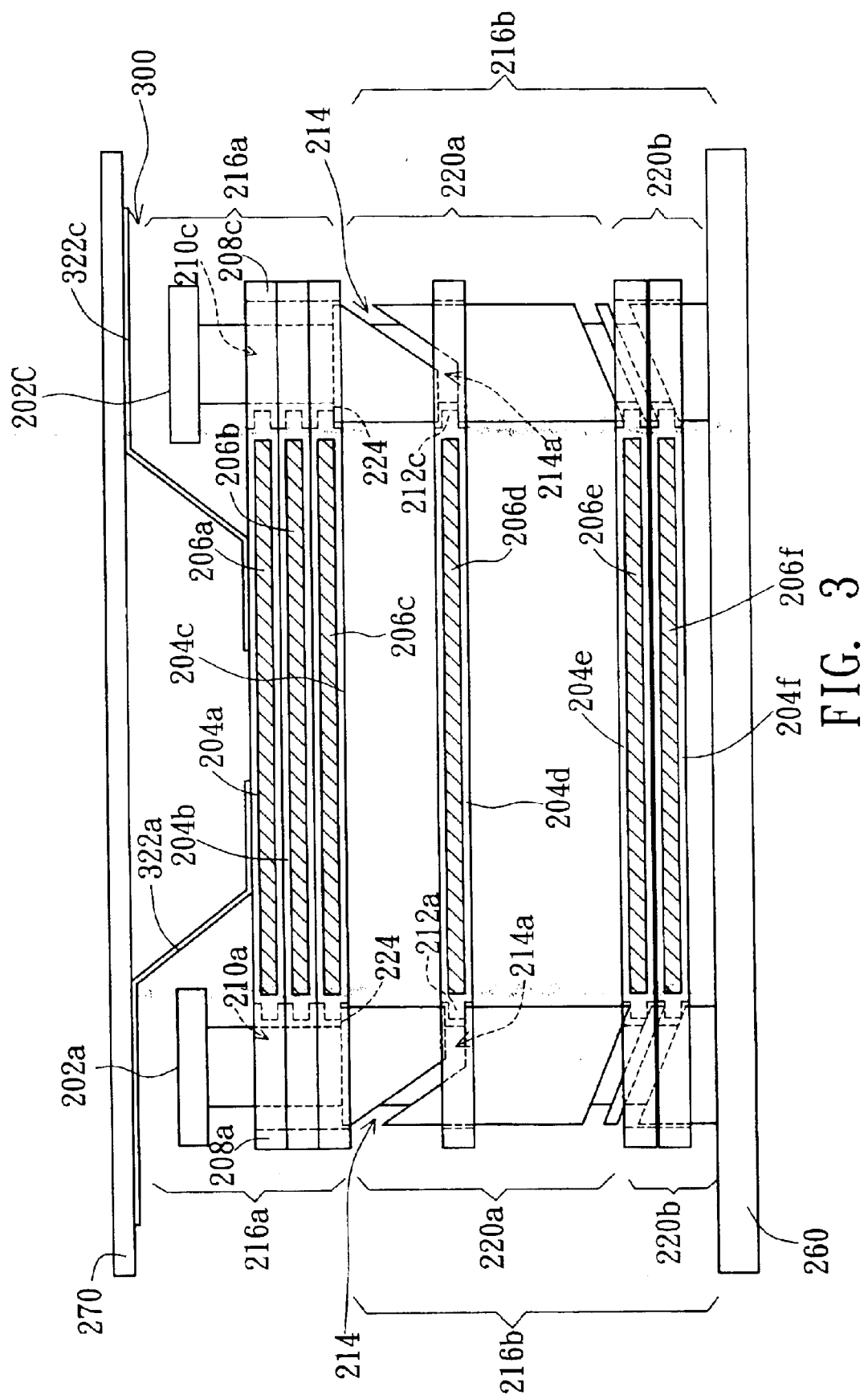
FIG. 3 is a partial lateral view of the optical disk changer in Example 2 according to a preferred embodiment of the invention.

Referring to FIG. 3, a partial lateral view of the optical disk changer in Example 2 according to a preferred embodiment of the invention is shown. The difference between the optical disk changer 300 in this example and that in apparatus 200 in Example 1 lies in the optical disk changer 300 including at least elastic plates 322a, 322b (not shown in the figure), and 322c instead of coil springs 222a, 222b, and 222c. The elastic plates 322a and 322c are respectively located near the driving shafts 202a and 202c, each of which has one end fixed to the top plate 270 of the optical disk drive. In FIG. 3, as trays 204a–204f are carried from the position held at the thread region 216b to that held at the upright region 216a by rotating the driving shafts 202a and 202c, they will be clamped between the other end of the elastic plate 322a or 322c and the flat surface 224 of the corresponding driving shaft 202a or 202c. Conversely, trays 204a–204f can be forced by elastic plates 322a and 322c by rotating the driving shafts 202a, 202b, and 202c to move along the thread 214 from the position held at the upright region 216a to that held at the thread region 216b.

As illustrated in Example 1 and Example 2, any three elastic devices, respectively disposed around or near the upright regions 216a of the three driving shafts can be used together with the flat surfaces 224 to clamp trays in the range of the upright regions 216a, for example, three coil springs, three elastic plates or a combination of springs and elastic plates. Trays 204a–204f can also be forced by the three elastic devices by rotating the three driving shafts to move along the thread 214 from a position held at the upright region 216a to that held at the thread region 216b.

EXAMPLE 3

Figure 4:
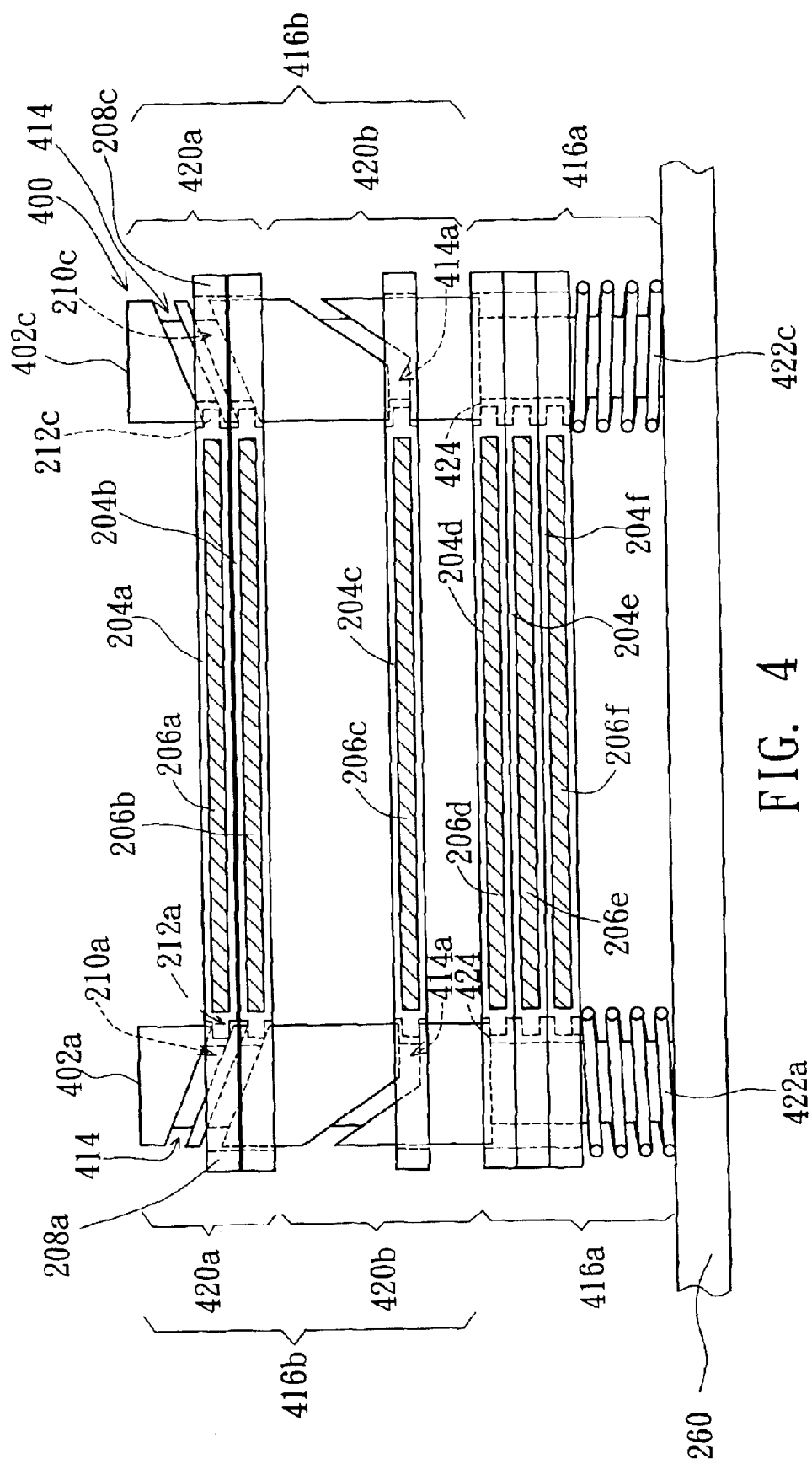
FIG. 4 is a partial lateral view of the optical disk changer in Example 3 according to a preferred embodiment of the invention.

Referring to FIG. 4, a partial lateral view of the optical disk changer in Example 3 according to a preferred embodiment of the invention is shown. The optical disk changer 400 includes at least three driving shafts, and the related positions between the three driving shafts, trays, and optical disks are the same as those in FIG. 2A.

In FIG. 4, the optical disk changer 400, mounted on the bottom plate 260 of an optical disk drive, includes at least driving shafts 402a, 402c, and a driving shaft not shown in the figure, for clamping disk trays 204a–204f. These trays 204a–204f can be raised and lowered to position at different heights by rotating the driving shafts 402a and 402c synchronously. The trays 204a–204f are provided for correspondingly holding disks 206a–206f, and the structure of the trays 204a–204f are the same as shown in FIG. 2A and FIG. 2B.

The driving shafts 402a and 402c, respectively inserted into the inserting holes 210a and 210c of the trays 204a–204f, are vertically positioned on the bottom plate 260, and are capable of rotating synchronously around their vertical axes so as to raise and lower the trays 204a–204f. Each of the driving shafts 402a and 402c includes an upright region 416a, mounted on the bottom plate 260, and a thread region 416b, located on the upright region 416a. The upright region 416a and the thread region 416b can be manufactured to a unity. The thread region 416b has threads 414 provided for engaging with the engaging projections 212a and 212c of the tray 204a (and those of the trays 204b–204f). The thread region 416b can be divided into an upper thread portion 420a and a lower thread portion 420b. The pitch for threads 414 in the upper thread portion 420a is smaller than that in the lower thread portion 420b. A flat surface 424 is specifically formed at the interface between the upright region 416a and the thread region 416b. The thread 414 in the upper thread portion 420a has an upper end leading to the flat surface 424, and a flat thread part 414a for advancing one of the trays 204a–204f, for example the tray 204c, to a disk loading in/out position. The driving shaft not shown in the figure is designed in the same way as the driving shafts 402a and 402c.

In the invention, the lower ends of the upright regions 416a of the driving shafts 402a and 402c are respectively encircled by coil springs 422a and 422c. Similarly, the lower end of the upright region 216a of the driving shaft not shown in the figure is also encircled by a coil spring. In FIG. 4, both of the coil springs 422a and 422c has one end fixed to the bottom plate 260. As trays 204a–204f are carried from the position held at the thread region 416b to that held at the upright region 416a by rotating the driving shafts 402a and 402c, they will be clamped between the other end of the coil spring 422a or 422c and the flat surface 424 of the corresponding driving shaft 402a or 402c. Conversely, trays 204a–204f can be forced by coil springs 422a and 422c by rotating the driving shafts 402a and 402c to move from the position held at the upright region 416a to that held at the thread region 416b.

In FIG. 4, the trays 204d, 204e, and 204f are held together tightly between the coil spring 422a, or 422c and the flat surface 424 of the corresponding driving shafts 402a, or 402c so as to position the disks 206d, 206e, and 206f in the range of the upright regions 416a. The trays 204a and 204b are engaged with the threads 414 in the upper thread portion 420a so as to position the disks 206a and 206b in the range of the upper thread portions 420a. Since the pitch for threads 414 in the upper thread portion 420a is smaller than that in the lower thread portion 420b, the tray 204c is engaged with the flat thread part 414a apart from other trays 204a, 204b, 204d, 204e, and 204f. Due to the design of the flat thread part 414a, the tray 204c engaged with the flat thread part 414a can be precisely carried to the disk loading in/out position.

EXAMPLE 4

Figure 5:
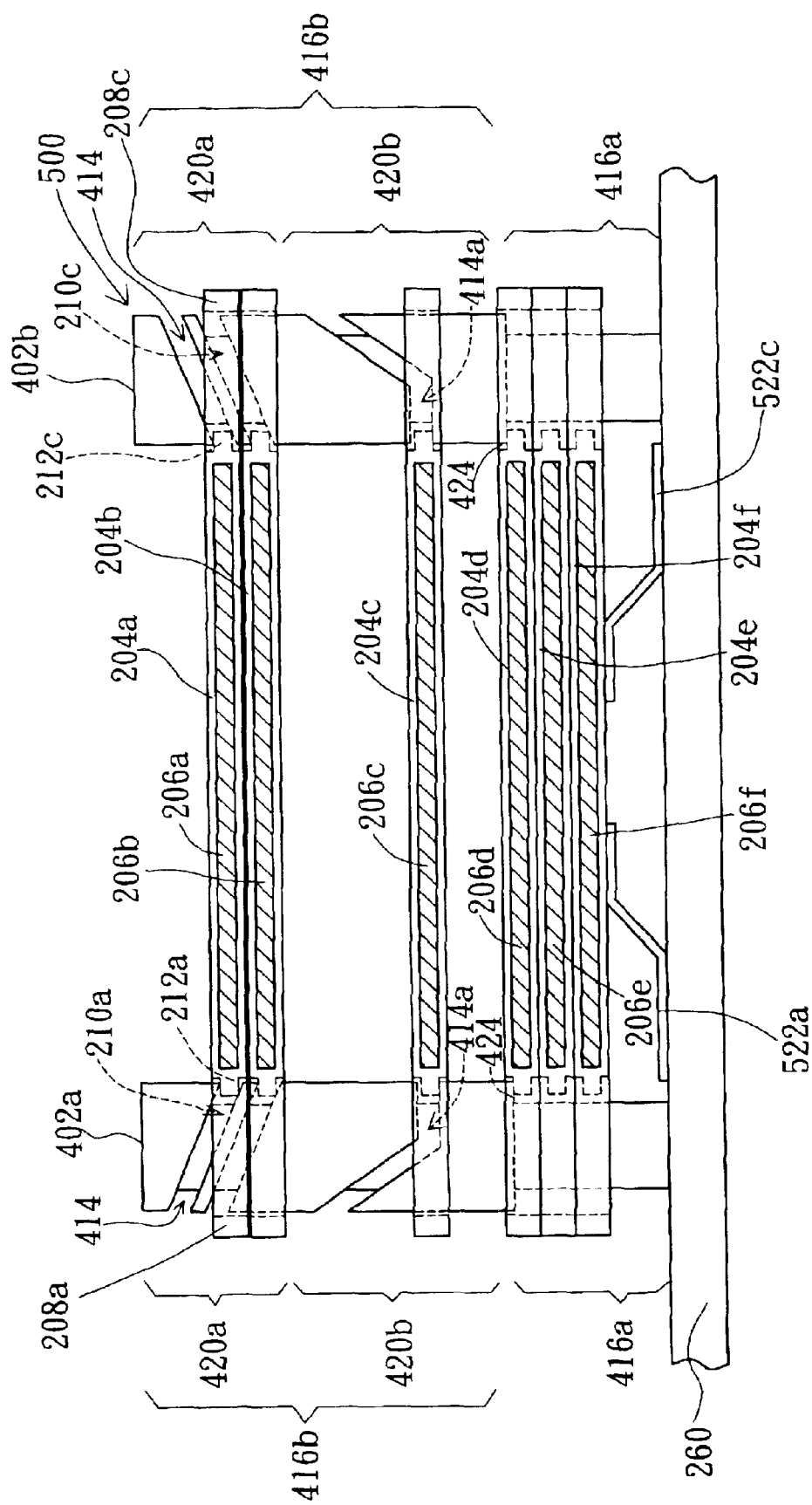
FIG. 5 is a partial lateral view of the optical disk changer in Example 4 according to a preferred embodiment of the invention.

Referring to FIG. 5, a partial lateral view of the optical disk changer in Example 4 according to a preferred embodiment of the invention is shown. The difference between the optical disk changer 500 in Example 4 and that apparatus 400 in Example 3 is in the optical disk changer 500 including at least elastic plates 522a and 522c instead of coil springs 422a and 422c. The elastic plates 522a and 522c, disposed on the bottom plate 260, are respectively located near the bottom of the driving shafts 402a and 402c. Similarly, an elastic plate, fixed on the bottom plate 260 and located near another driving shaft not shown in FIG. 5 is provided.

In FIG. 5, each of the elastic plates 522a and 522c has one end fixed to the bottom plate 260. As trays 204a–204f are carried from the position held at the thread region 416b to that held at the upright region 416a by rotating the driving shafts 402a and 402c, they will be clamped between the other end of the elastic plate 522a or 522c and the flat surface 424 of the corresponding driving shaft 402a or 402c. Conversely, trays 204a–204f can be forced by elastic plates 522a and 522c by rotating the driving shafts 402a and 402c to move along the thread 414 from the position held at the upright region 416a to that held at the thread region 416b.

As illustrated in Example 3 and Example 4, any three elastic devices, respectively disposed around or near the upright regions 416a of the three driving shafts can be used together with the flat surfaces 424 to clamp trays in the range of the upright regions 416a, for example, three coil springs, three elastic plates or a combination of springs and elastic plates. Trays 204a–204f can also be forced by the three elastic devices by rotating the three driving shafts to move along the thread 414 from the position held at the upright region 416a to that held at the thread region 416b.

EXAMPLE 5

Figure 6:
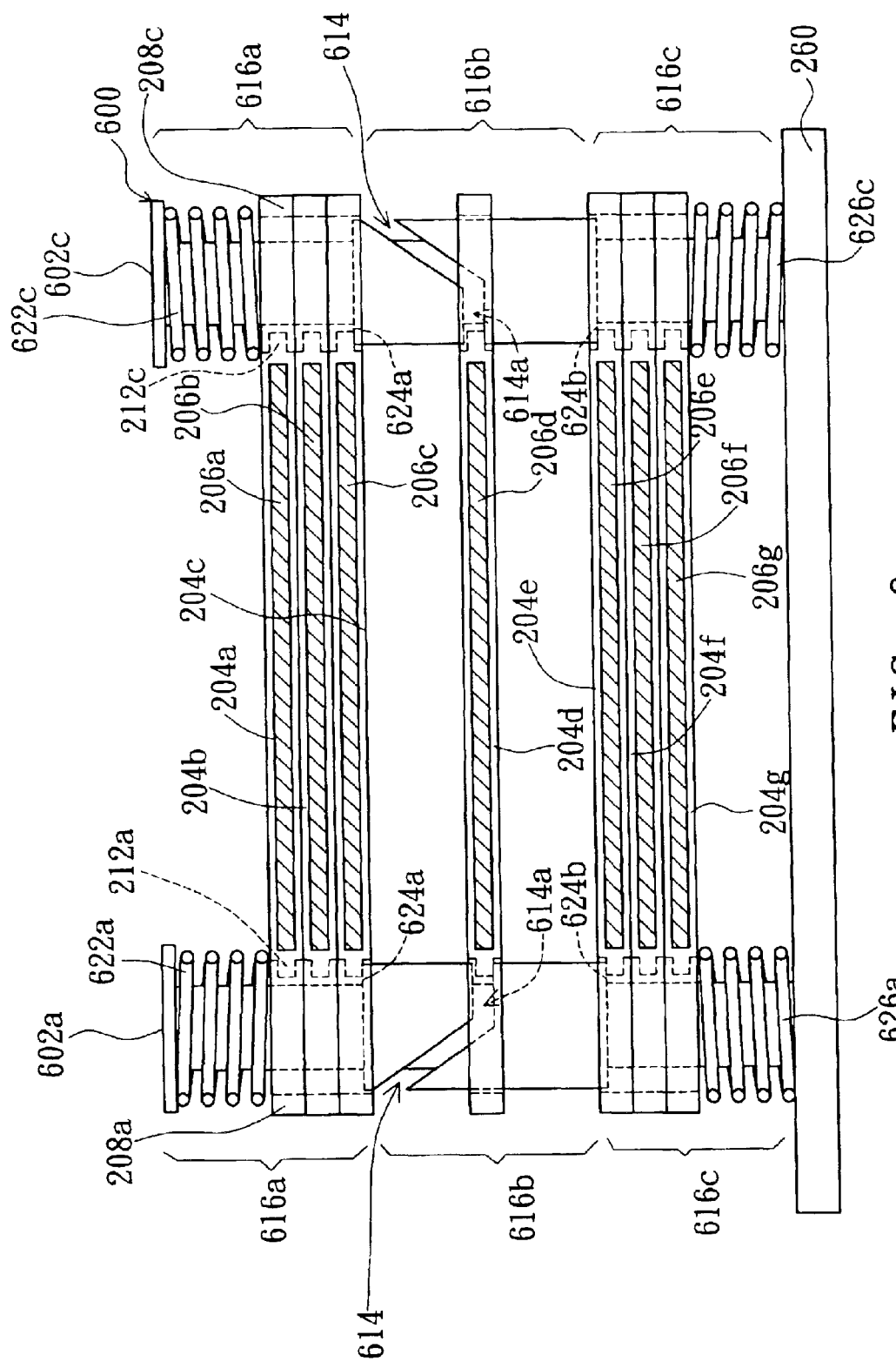
FIG. 6 is a partial lateral view of the optical disk changer in Example 5 according to a preferred embodiment of the invention.

Referring to FIG. 6, a partial lateral view of the optical disk changer in Example 5 according to a preferred embodiment of the invention. The optical disk changer 600 includes at least three driving shafts, and the related positions between the three driving shafts, trays, and optical discs are the same as those in FIG. 2A.

In FIG. 6, the optical disk changer 600, mounted on the bottom plate 260 of an optical disk drive, includes at least driving shafts 602a, 602c, and a driving shaft not shown in the figure, for holding disk trays 204a, 204b, 204c, 204d, 204e, 204f, and 204g. These trays 204a–204g can be raised and lowered to position at different heights by rotating the driving shafts 602a and 602c synchronously. The trays 204a–204g are provided for correspondingly holding disks 206a–206g, and the structure of the trays 204a–204g are as shown in FIG. 2A and FIG. 2B.

The driving shafts 602a and 602c, respectively inserted into the inserting holes 210a and 210c of the tray 204a (as well as those of the trays 204b–204g), are vertically positioned on the bottom plate 260, and are capable of rotating synchronously around their vertical axes so as to raise and lower the trays 204a–204g. Both of the driving shafts 602a and 602c include an upper upright region 616a, a thread region 616b, located under the upper upright region 616a, and a lower upright region 616c, located under the thread region 616b and mounted on the bottom plate 260. The upper upright region 616a, the thread region 616b, and the lower upright region 616c can be manufactured to a unity. The thread region 616b has a thread 614 provided for engaging with the engaging projections 212a and 212c of the tray 204a (and those of the trays 204b–204g). The thread 614 has a flat thread part 614a for advancing one of the trays 204a–204g to a disk loading in/out position. A lower flat surface 624b is formed at the interface between the lower upright region 616c and the thread region 616b, to which the lower end of the thread 614 can progress. Similarly, an upper flat surface 624a is formed at the interface between the upper upright region 616a and the thread region 616b, to which the upper end of the thread 614 can progress. The driving shaft not shown in FIG. 6 is designed in the same way as the driving shafts 602a and 602c.

In the invention, the upper end of the upper upright region 616a and the lower end of the lower upright region 616c on the driving shafts 602a are respectively encircled by coil springs 622a and 626a. Similarly, the upper end of the upper upright region 616a and the lower end of the lower upright region 616c on the driving shafts 602c are respectively encircled by coil springs 622c and 626c. Moreover, the upper and lower upright regions of the driving shaft not shown in the figure are also respectively encircled by coil springs. In FIG. 6, coil spring 622a and 622c respectively have one end fixed to the top end of the upper upright region 616a of the driving shaft 602a and 602c. As trays 204a–204g are carried from a position held at the thread region 616b to that held at the upper upright region 616a by rotating the driving shafts 602a and 602c, they will be clamped between the other end of the coil spring 622a or 622c and the upper flat surface 624a of the corresponding driving shaft 602a or 602c. Conversely, trays 204a–204g can be forced by coil springs 622a and 622c by rotating the driving shafts 602a and 602c to move along the thread 614 from the position held at the upper upright region 616a to that held at the thread region 616b.

In addition, the coil springs 626a and 626c respectively have one end fixed to the bottom plate 260. As trays 204a–204g are carried from a position held at the thread region 616b to that held at the lower upright region 616c by rotating the driving shafts 602a and 602c, they will be clamped between the other end of the coil spring 626a or 626c and the lower flat surface 624b of the corresponding driving shaft 602a or 602c. Conversely, trays 204a–204g can be forced by coil springs 626a and 626c by rotating the driving shafts 602a and 602c to move along the thread 614 from the position held at the lower upright region 616c to that held at the thread region 616b.

In FIG. 6, the trays 204a, 204b, and 204c are held together tightly between the coil spring 622a, or 622c and the corresponding upper flat surface 624a so as to position the disks 206a, 206b, and 206c in the range of the upper upright regions 616a. The trays 204e, 204f, and 204g are securely held together between the coil spring 626a, or 626c and the corresponding lower flat surface 624b so as to position the disks 206e, 206f, and 206g in the range of the lower upright regions 616b. The tray 204d engaged with the flat thread part 614a is apart from other trays 204a, 204b, 204c, 204e, 204f, and 204g. Due to the design of the flat thread part 614a, the tray 204d, engaged with the flat thread part 614a, can be precisely carried to the disk loading in/out position.

EXAMPLE 6

Figure 7:
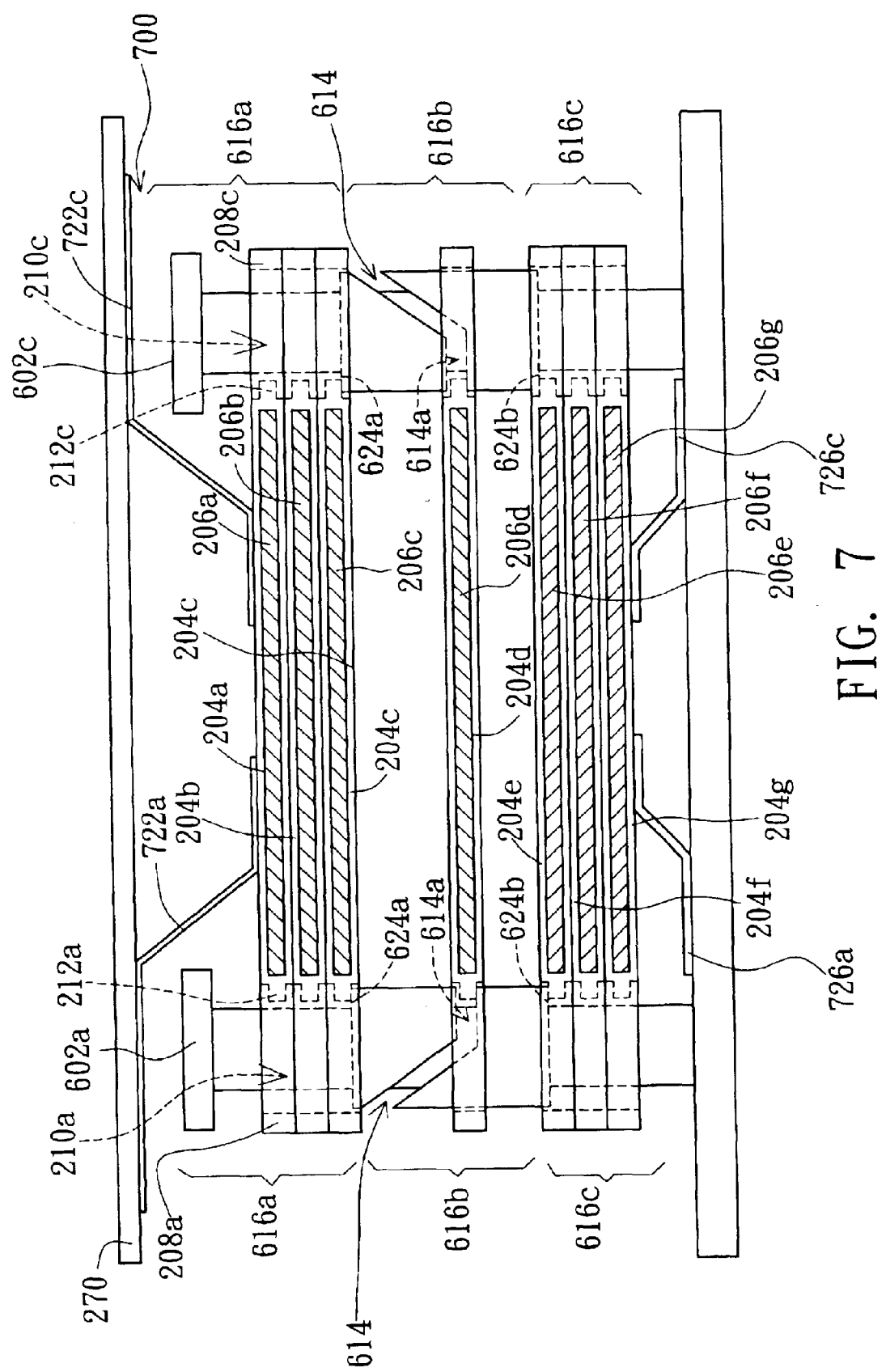
FIG. 7 is a partial lateral view of the optical disk changer in Example 6 according to a preferred embodiment of the invention.

Referring to FIG. 7, a partial lateral view of the optical disk changer in Example 6 according to a preferred embodiment of the invention is shown. The difference between the optical disk changer 700 in Example 6 and that apparatus 600 in Example 5 is in the optical disk changer 700 including at least elastic plates 722a, 722c, 726a, and 726c instead of coil springs 622a, 622c, 626a, and 626c. The elastic plates 722a and 722c, located beneath the top plate 270 of the optical disk drive, respectively have one end fixed to the top plate 270 above the top of the driving shafts 602a and 602c. The elastic plates 726a and 726c, located on the bottom plate 260 of the optical disk drive, respectively have one end fixed to the bottom plate 260 near the driving shafts 602a and 602c. Similarly, two elastic plates are respectively fixed beneath the top plate 270 and on the bottom plate 260, near the driving shaft not shown in FIG. 7.

In FIG. 7, the elastic plates 722a and 722c respectively have one end fixed beneath the top plate 270. As trays 204a–204g are carried from a position held at the thread region 616b to one held at the upper upright region 616a by rotating the driving shafts 602a and 602c, they will be clamped between the other end of the elastic plate 722a or 722c and the upper flat surface 624a of the corresponding driving shaft 602a or 602c. Conversely, trays 204a–204g can be forced by elastic plates 722a and 722c by rotating the driving shafts 602a and 602c to move along the thread 614 from the position held at the upper upright region 616a to that held at the thread region 616b.

In addition, the elastic plates 726a and 726c respectively have one end fixed on the bottom plate 260. As trays 204a–204g are carried from a position held at the thread region 616b to one held at the lower upright region 16c by rotating the driving shafts 602a and 602c, they will be clamped between the other end of the elastic plate 726a or 726c and the lower flat surface 624b of the corresponding driving shaft 602a or 602c. Conversely, trays 204a–204g can be forced by elastic plates 726a and 726c by rotating the driving shafts 602a and 602c to move along the thread 614 from a position held at the lower upright region 616c to one held at the thread region 616b.

As illustrated in Example 5 and Example 6, any three upper elastic devices, respectively disposed around or near the upper upright regions 616a of the three driving shafts can be used together with the upper flat surfaces 624a to clamp trays in the range of the upper upright regions 616a, for example, three coil springs, three elastic plates or a combination of springs and elastic plates. Trays 204a–204g can also be forced by the three upper elastic devices by rotating the three driving shafts to move along the thread 614 from the position held at the upper upright region 616a to that held at the thread region 616b. In addition, any three lower elastic devices, respectively disposed around or near the lower upright regions 616c of the three driving shafts can be used together with the lower flat surface 624b to clamp trays in the range of the lower upright regions 616c, for example, three coil springs, three elastic plates or a combination of springs and elastic plates. Trays 204a–204g can also be forced by the three lower elastic devices by rotating the three driving shafts to move along the thread 614 from a position held at the lower upright region 616c to one held at the thread region 616b.

However, one who is skilled in the art will recognize that the skill of the invention is not limited to those mentioned above. For example, the tray design in the optical disk changer may also be removed as long as the three driving shafts are appropriately situated in relation to each other so as to hold optical disks. In this case, the threads of the three driving shafts are directly engaged with the edge of the disks, and the disks located in the range of the upright regions are clamped between the elastic device and the flat surface of the corresponding driving shaft. Optical disks can also be forced by the three elastic devices by rotating the three driving shafts to move along the thread from the position held at the upright region to that held at the thread region.

The optical disk changer disclosed in the preferred embodiment mentioned above has the following advantages:

1. The elastic devices in the present invention can make trays or disks in the range of the upright regions of the driving shafts stay in close proximity to one another, and hence the height of the driving shafts can be reduced since there is no increase in the number of the trays or disks. Therefore, the optical disk drive including the optical disk changer of the present invention meets current design requirements for devices that are thin and small.

2. The flat thread design of the present invention can precisely situate trays or disks to the disk loading in/out position so as to improve the accuracy of positioning disks.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus for changing optical disks, mounted in an optical disk drive, provided for holding a plurality of trays or optical disks, the optical disk drive including a bottom plate and a top plate, the apparatus for changing optical disks comprising at least:

a plurality of driving shafts, vertically positioned on the bottom plate for clamping the trays or the optical disks, each of the driving shafts having a vertical axis and rotating synchronously around the vertical axis thereof to raise and lower the trays or the optical disks, the driving shafts comprising:

a thread region, mounted on the bottom plate, the thread region comprising threads for engaging with the trays or the optical disks, the thread region comprising a lower thread portion and an upper thread portion, wherein the pitch for threads in the upper thread portion is larger than that in the lower thread portion; and an upright region, located on the thread region, wherein a flat surface is formed between the upright region and the thread region; and a plurality of elastic devices, each of the elastic devices having one end respectively fixed to a top end of the upright region of the corresponding driving shaft or fixed beneath the top plate, and the other end provided together with the flat surface for clamping the tray or the optical disk located in the range of the upright regions.

2. The apparatus according to claim 1, wherein the thread in the upper thread portion has a flat thread part for situating one of the trays or one of the optical disks to a disk loading in/out position.

3. The apparatus according to claim 1, wherein the elastic devices are a plurality of coil springs, respectively encircling around an upper end of the upright region of the driving shafts, and each of the coil springs has one end respectively fixed to the top end of the upright region of the driving shafts, and the other end provided together with the flat surface of the corresponding driving shaft for clamping the tray or the optical disk located in the range of the upright regions.

4. The apparatus according to claim 1, wherein the elastic devices are a plurality of elastic plates, and each of the elastic plates has respectively one end fixed beneath the top plate and located near the upright region of driving shafts, and the other end provided together with the flat surface of the corresponding driving shaft for clamping the tray or the optical disk in the range of the upright regions.

5. An apparatus for changing optical disks, mounted in an optical disk drive, provided for holding a plurality of trays or optical disks, the optical disk drive including a bottom plate, the apparatus for changing optical disks comprising at least:
a plurality of driving shafts, vertically positioned on the bottom plate for clamping the trays or the optical disks, each of the driving shafts having a vertical axis and rotating synchronously around the vertical axis thereof to raise and lower the trays or the optical disks, the driving shafts comprising:
an upright region, mounted on the bottom plate; and
a thread region, located on the upright region, the thread region comprising threads for engaging with the trays or the optical disks, the thread region comprising a lower thread portion and an upper thread portion, wherein the pitch for threads in the lower thread portion is larger than that in the upper thread portion, and wherein a flat surface is formed between the upright region and the thread region; and
a plurality of elastic devices, each of the elastic devices having one end fixed on the bottom plate and located near the corresponding driving shaft, and the other end provided together with the flat surface of the corresponding driving shaft for clamping the tray or the optical disk located in the range of the upright regions.

6. The apparatus according to claim 5, wherein the thread in the lower thread portion has a flat thread part for situating one of the trays or one of the optical disks to a disk loading in/out position.

7. The apparatus according to claim 5, wherein the elastic devices are a plurality of coil springs, encircling around a lower end of the upright region of the driving shafts, and each of the coil springs has one end respectively fixed on the bottom plate, and the other end provided together with the flat surface of the corresponding driving shaft for clamping the tray or the optical disk located in the range of the upright regions.

8. The apparatus according to claim 5, wherein the elastic devices are a plurality of elastic plates, and each of the elastic plates has one end respectively fixed on the bottom plate, and the other end provided together with the flat surface of the corresponding driving shaft for clamping the tray or the optical disk in the range of the upright regions.

9. An apparatus for changing optical disks, mounted in an optical disk drive, provided for holding a plurality of trays or optical disks, the optical disk drive including a bottom plate and a top plate, the apparatus for changing optical disks comprising:
a plurality of driving shafts, vertically mounted on the bottom plate for clamping the trays or the optical disks, each of the driving shafts having a vertical axis and rotating synchronously around the vertical axis thereof to raise and lower the trays or the optical disks, the driving shafts comprising:
a lower upright region, mounted on the bottom plate;
a thread region, mounted on the lower upright region, the thread region comprising threads for engaging with the trays or the optical disks, wherein a lower flat surface is formed between the thread region and the lower upright region; and
an upper upright region, located on the thread region, wherein an upper flat surface is formed between the upper upright region and the thread region;
a plurality of upper elastic devices, each of the upper elastic devices having one end fixed to a top end of the upper upright region of the corresponding driving shaft or fixed beneath the top plate, and the other end provided together with the upper flat surface for clamping the tray or the optical disk located in the range of the upper upright regions; and
a plurality of lower elastic devices, each of the lower elastic devices having one end fixed on the bottom plate and located near the corresponding driving shaft, and the other end provided together with the lower flat surface of the corresponding driving shaft for clamping the tray or the optical disk located in the range of the lower upright regions.

10. The apparatus according to claim 9, wherein the thread has a flat thread part for situating one of the trays or one of the optical disks to a disk loading in/out position.

11. The apparatus according to claim 9, wherein the upper elastic devices are a plurality of coil springs, respectively encircling around an upper end of the upper upright region of the driving shafts, and each of the coil springs has respectively one end fixed to a top end of the corresponding driving shaft, and the other end provided together with the upper flat surface of the corresponding driving shaft for clamping the tray or the optical disk located in the range of the upper upright regions.

12. The apparatus according to claim 9, wherein the upper elastic devices are a plurality of elastic plates, and each of the elastic plates has one end respectively fixed beneath the top plate and located near the upper upright region of the corresponding driving shaft, and the other end provided together with the upper flat surface of the corresponding driving shaft for clamping the tray or the optical disk in the range of the upper upright regions.

13. The apparatus according to claim 9, wherein the lower elastic devices are a plurality of coil springs, respectively encircling around a lower end of the lower upright region of the corresponding driving shaft, and each of the coil springs has respectively one end fixed on the bottom plate, and the other end provided together with the lower flat surface of the corresponding driving shaft for clamping the tray or the optical disk located in the range of the lower upright regions.

14. The apparatus according to claim 9, wherein the lower elastic devices are a plurality of elastic plates, each of the elastic plates has one end respectively fixed on the bottom plate, and the other end provided together with the lower flat surface of the corresponding driving shaft for clamping the tray or the optical disk in the range of the lower upright regions.

* * * * *